United States Patent
Nickerson et al.

(10) Patent No.: US 7,048,104 B2
(45) Date of Patent: May 23, 2006

(54) SELECTIVE BYPASS OF SOLENOID-CONTROLLED SUPPLY TO FRICTION ELEMENTS OF AN AUTOMATIC TRANSMISSION

(75) Inventors: Kurt Nickerson, Farmington, MI (US); Lee Becker, Canton, MI (US); Charles Barnes, Plymouth, MI (US); Rodney Smith, Vinalhaven, ME (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 10/662,102

(22) Filed: Sep. 12, 2003

(65) Prior Publication Data

US 2005/0056515 A1    Mar. 17, 2005

(51) Int. Cl.
*B60K 41/22* (2006.01)
*F16D 25/10* (2006.01)

(52) U.S. Cl. ............. 192/3.63; 192/51; 192/87.13
(58) Field of Classification Search ............. 192/3.58, 192/3.63, 51, 87.13, 87.18, 87.19, 109 F; 475/127; 701/67
See application file for complete search history.

(56) References Cited

U.S. PATENT DOCUMENTS

| | | | | |
|---|---|---|---|---|
| 4,351,206 A | * | 9/1982 | Lemieux et al. | 475/127 |
| 4,730,708 A | * | 3/1988 | Hamano et al. | 192/109 F |
| 4,827,805 A | * | 5/1989 | Moan | 192/3.58 |
| 4,941,370 A | * | 7/1990 | Ishii | 475/128 |
| 5,046,592 A | * | 9/1991 | Mainquist et al. | 192/3.58 |
| 5,577,584 A | * | 11/1996 | Ortmann | 192/87.13 |
| 5,674,150 A | * | 10/1997 | Morishita et al. | 192/3.63 |
| 6,007,445 A | * | 12/1999 | Kirchhoffer et al. | 475/116 |
| 2002/0086758 A1 | * | 7/2002 | Park et al. | 475/116 |
| 2004/0067810 A1 | * | 4/2004 | Fujimine et al. | 475/127 |

* cited by examiner

*Primary Examiner*—Rodney H. Bonck
(74) *Attorney, Agent, or Firm*—David B. Kelley; MacMillan, Sobanski & Todd

(57) ABSTRACT

A hydraulic system for controlling the engagement and disengagement of a friction element includes a source of line pressure, a source of exhaust pressure, a manual valve having a forward state and a reverse state, connected to the exhaust pressure source and line pressure source and including a first outlet and a second outlet, for opening and closing communication between said outlets and said pressure sources in response to changes in the states, a friction element communicating with the line pressure source through the manual valve in the reverse state, and a control valve including a port communicating with the friction element, the control valve producing control pressure at the port when the manual valve is in the forward state.

10 Claims, 2 Drawing Sheets

SELECTIVE BYPASS OF SOLENOID-CONTROLLED SUPPLY TO FRICTION ELEMENTS OF AN AUTOMATIC TRANSMISSION

BACKGROUND OF THE INVENTION

The invention relates to fluid control and actuation systems. More particularly, it pertains to the application and release of friction elements used in a power transmission for a motor vehicle.

In an automatic transmission the various speed ratios of the transmission result by selectively engaging and disengaging friction elements, such as hydraulically actuated clutches and brakes. The applied and released condition of the friction elements connects and disconnects elements of the planetary gearsets to produce the gear ratios. The friction elements are applied and released in response to the pressurized and vented state of the friction elements.

In such a transmission operating according to the principles of direct electronic shift control, the pressure of each friction element is controlled by a solenoid-operated control valve in response to a command signal produced by an electronic controller that repetitively executes computer coded control algorithms. The command signal automatically produces upshifts and downshifts in accordance with a control strategy that relies on input signals produced by sensors, which monitor operating conditions of the vehicle, its engine, and requests of the vehicle operator related to powertrain performance.

The magnitude of torque transmitted by the various friction elements in the several gear ratios is reflected in the magnitude of pressure applied to each friction element. When the magnitude of transmitted torque is high, the magnitude of actuating pressure is high. Generally, during operation in the lowest forward drive gears and reverse gear, the transmitted torque magnitude is high. In the higher forward drive gears, the magnitude of transmitted torque is low. For example, the control pressure supplied to a friction element in reverse gear may be approximately 300 psi., whereas the control pressure supplied to a friction element in the higher gears may be approximately 150 psi.

During operation in gear ratios where a high control pressure is needed, a large gain is required to control accurately the control pressure in response to the pressure command produced by the controller. A lower gain is required when control pressure is low. To produce accurate shift control, it is preferred that incremental changes in the command signal produce relatively small changes in control pressure.

Generally, a control system for an automatic transmission produces line pressure up to 300 psi. Control pressure is the result of regulating line pressure by controlling the size of the hydraulic connection between the line pressure source and the control element, and the opening between the control source and a relatively low exhaust pressure source, generally the sump or transmission reservoir where excess hydraulic fluid is held for return to the system.

For those friction elements that are employed in both high control pressure ratios and low control pressure ratios, it is preferred to alternate between a low gain and a high gain control system at an additional cost rather than to accept the compromised resultant shift quality

SUMMARY OF THE INVENTION

An advantage of the present invention is the use of relatively low gain, variable force solenoids (VFS), which produce control pressure for a clutch or another friction element in response to a command signal. The system bypasses a direct clutch VFS and a low/reverse clutch VFS by applying line pressure directly to those clutches in reverse drive where high gain is required. In forward drive, those clutches are engaged with the lower gain VFS.

Another advantage is avoiding the need for redundant VFSs or additional valving to develop and apply control pressure under low gain control in forward drive, yet achieve torque capacity requirements in reverse drive.

To realize these advantages, a system according to this invention for engaging and disengaging a friction element operating in a forward state and a reverse state includes a source of line pressure, an exhaust pressure source, a control valve hydraulically connectable to the line pressure source and exhaust pressure source, for producing control pressure in the forward state, and a friction element communicating with the line pressure source in the reverse state and communicating with the control valve in the forward state.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
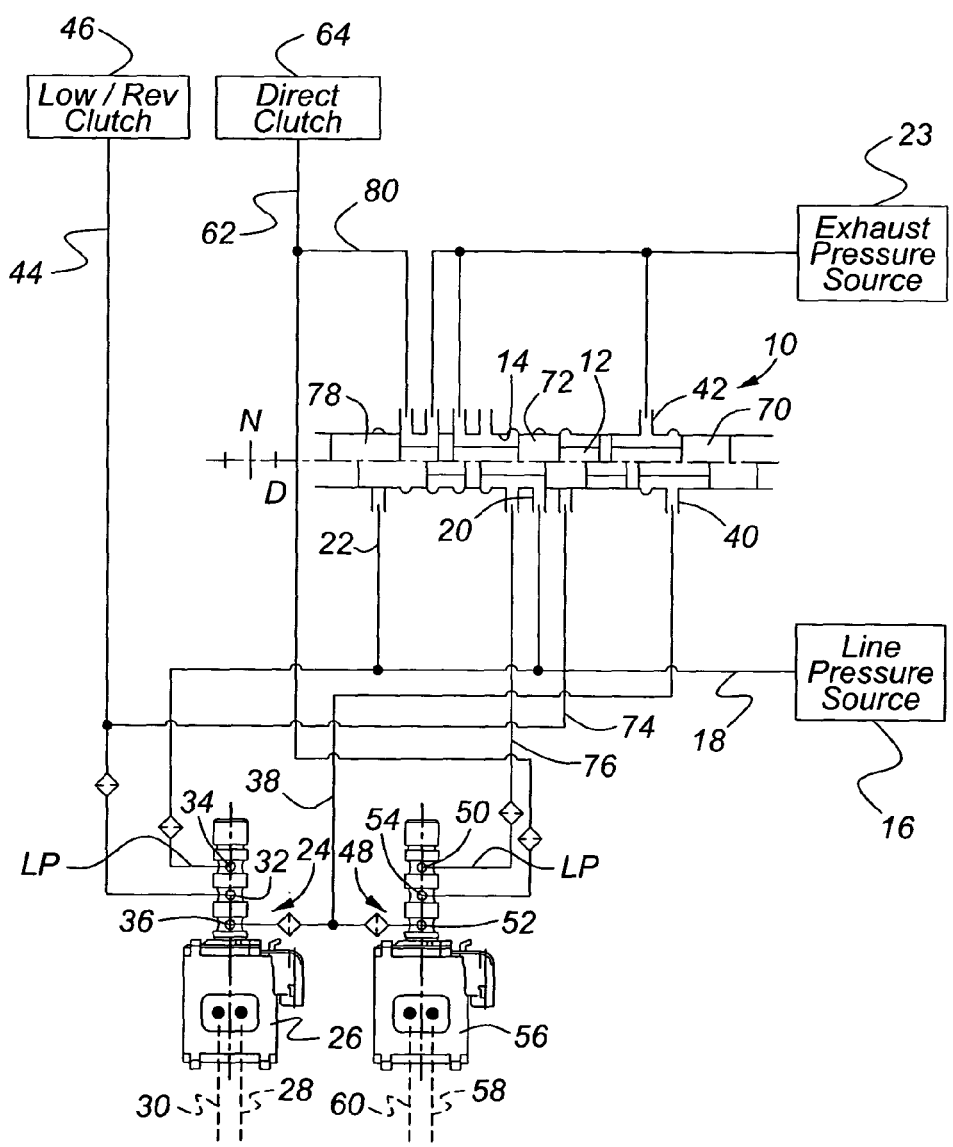
FIG. 1 is a schematic diagram of a hydraulic system showing a manual valve in a forward drive state and a reference neutral state.

Referring first to FIG. 1, a manual valve 10 includes a spool 12 movable within a chamber 14 from the neutral state rightward to the forward drive state illustrated below the center line of the valve spool in FIG. 1. The state of the valve, i.e., position of the valve spool within chamber 14, corresponds to the position of a range selector, located in the passenger compartment and controlled by the vehicle operator's movement among park, reverse, neutral and drive positions. A line pressure source 16 is connected through a hydraulic line 18 to inlet ports 20, 22 of the manual valve. An exhaust pressure source 23, a reservoir containing hydraulic fluid at relatively low pressure, is hydraulically connected to the manual valve.

A first control valve 24 is operated by a variable force solenoid 26 coil supplied with a variable electric current through lines 28, 30 under control of an electronic controller. Valve 24 includes a port 32 where control pressure is produced by valve 24 in response to the variable current applied to solenoid 26. Solenoid 26 is a proportional valve; therefore, the magnitude of control pressure produced at port 32 increases in proportion to the magnitude of the electric current applied to the solenoid 26. The source of line pressure 16 is continually connected by line 18 to an input port 34. The exhaust pressure source 23 is connected to port 36 during the forward drive state through lines 38, port 40, and outlet port 42 of the manual valve 10. The control valve 24 controls the size of a connection within the valve between line pressure port 34 and port 32, or between port 32 and exhaust port 36 as the magnitude of the electric current applied to solenoid 26 varies. In this way, the magnitude of control pressure at control port 32 changes in accordance with the execution by the electronic controller of control algorithms, whose execution results in the variable force electric current command signal applied to solenoid 26. Control port 32 is connected through line 44 to a low/reverse clutch 46.

Similarly, a second control valve 48 includes a line pressure port 50, an exhaust port 52, and a control port 54. Valve 48 is controlled by operation of a solenoid 56, which controls the size of a connection within the valve between ports 50 and 54, or port 50 and the exhaust port in accordance with the magnitude of command electric current applied to solenoid 56 by the electronic controller through lines 58, 60. Valve 48 is an inverse proportional output; therefore, the magnitude of control pressure produced at port 54 varies inversely with the magnitude of electric current applied to the terminals through lines 58, 60. Control port 54 is connected through passage 62 to a direct clutch 64.

The low reverse clutch 46 and direct clutch 64 are alternately engaged and disengaged to control connections among components of planetary gearsets. Various speed ratios of the transmission are changed as clutches 46, 64 engage and disengage in combination with other friction elements. Direct clutch 64 and low reverse clutch 46 are engaged during reverse drive and in several of the forward drive ratios. Because the magnitude of torque transmitted by clutches 46 and 64 is higher in reverse drive than in forward drive, when these clutches are engaged, the magnitude of pressure applied to engage them is greater in the reverse drive state than in the forward drive state. For example, the magnitude of maximum control pressure produced at control ports 32 and 54 in the forward drive state is approximately 150 psi., whereas the maximum magnitude of control pressure required by clutches 46 and 64 in the reverse drive state is approximately 300 psi.

The spool 12 of manual valve 10 is formed with a first control land 70, which opens a connection between port 40 and the exhaust pressure source 24 through port 42 when the manual valve is in the forward state, and closes that connection when the manual valve is in the reverse state. A second land 72 closes port 20 when the manual valve is in the neutral state, opens a connection between the line pressure source 16 through port 20 to passages 74 and 44 and clutch 46 when the manual valve is in the reverse state, and opens a connection between the line pressure source through port 20 and passage 76 to the low pressure port 50 when the manual valve is in the forward state. Land 78 closes port 22 when the manual valve is in the forward state and neutral state. Land 78 opens a connection between the line pressure source 16 to passages 80 and 62 and the direct clutch 64 in the reverse state.

During operation in the forward state, spool 12 is located as shown below the centerline of the spool in FIG. 1. Exhaust ports 36 and 52 of control valves 24 and 48 are both connected through passage 38, ports 40 and 42 to the exhaust pressure source 23. The line pressure source 16 is connected continually through passage 18 to the line pressure port 34 of control valve 24. The line pressure source 16 is connected also through port 20 and passage 76 to the line pressure port 50 of control valve 48. Therefore, control pressure is produced at control ports 32, 54 of the control valves 24, 48, respectively. Control pressure produced by control valve 24 is applied to the low reverse clutch 46 through passage 44. Control pressure produced by control valve 48 is connected through line 62 to the direct clutch 64.

Figure 2:
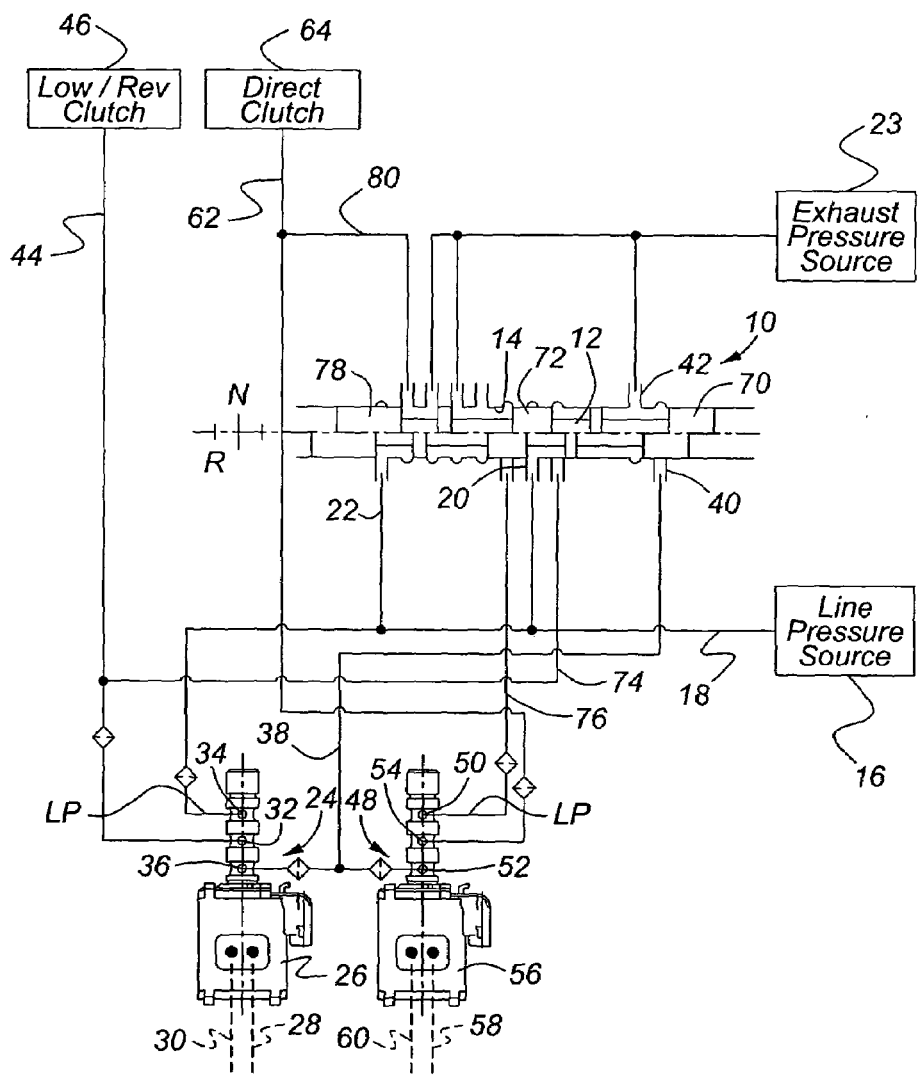
FIG. 2 is a schematic diagram of a hydraulic system showing a manual valve in a reverse drive state and a reference neutral state.

During operation in the reverse state, spool 12 is located as shown below the centerline of the spool in FIG. 2. Land 70 closes exhaust ports 36 and 52 from communication with the exhaust pressure source 23. Therefore, control pressure is not produced in either of the control ports 32 or 54 of the control valves 24, 48. However, land 72 opens a connection between the line pressure source 16 through port 20 to the low reverse clutch 46 though passages 44 and 74. Land 78 opens a connection between the line pressure source 16 through port 22 to the direct clutch 64 through passages 80 and 62.

Control valves 24, 48 produce control pressure in the forward state at a lower magnitude, or gain of control pressure change to command signal, than that of line pressure, and the system connects the control ports to clutches 46, 64. In the reverse state, line pressure rather than control pressure is applied to the clutches 46, 64 and the solenoid-actuated control valves 24, 48 are bypassed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

We claim:

1. A system for controlling engagement and disengagement of a friction element, comprising:
   a source of line pressure;
   a source of exhaust pressure;
   a manual valve having a forward state and a reverse state, connected to the exhaust pressure source and line pressure source and including a first outlet, a second outlet, for opening and closing communication between said outlets and said pressure sources in response to changes in the states, and a third outlet;
   a friction element communicating with the line pressure source through a hydraulic path that includes the manual valve in the reverse state but no other valve;
   a control valve including a port communicating with the friction element, the control valve producing control pressure at the port when the manual valve is in the forward state; and
   a second friction element communicating with the line pressure source through the third outlet in the reverse state.

2. The system of claim 1, wherein the control valve communicates with the line pressure source, and communicates with the exhaust pressure source through the first outlet in the forward state.

3. The system of claim 1, wherein the friction element communicates with the line pressure source through the second outlet in the reverse state.

4. The system of claim 1, wherein the manual valve includes a third outlet and a fourth outlet, the system further comprising:
   a second friction element communicating with the line pressure source through the third outlet in the reverse state; and
   a second control valve communicating with the line pressure source through the fourth outlet when the manual valve is in the forward state, communicating with the exhaust pressure source through the first outlet when the manual valve is in the forward state, including a second port communicating with the second friction element, the control valve producing control pressure at the second port when the manual valve is in the forward state.

5. The system of claim 1, wherein the manual valve includes a third outlet and a fourth outlet, the system further comprising:
- a second friction element communicating with the line pressure source through the third outlet when the manual valve is in the reverse state; and
- a second control valve including a second port communicating with the second friction element, the control valve producing control pressure at the second port when the manual valve is in the forward state.

6. A system for controlling engagement and disengagement of a friction element, comprising:
- a source of line pressure;
- a source of exhaust pressure;
- a manual valve including a chamber hydraulically connected to the exhaust pressure source and line pressure source, a spool moveable in the chamber between a forward state and a reverse state including
- a first land for opening communication to the exhaust pressure source through the manual valve in the forward state and for closing said communication in the reverse state,
- a second land for opening communication to the line pressure source through a first outlet of the manual valve in the reverse state and for closing said communication through the first outlet in the forward state;
- a friction element communicating with the line pressure source through a hydraulic path that includes the manual valve and no other valve; and
- a control valve including a port communicating with the friction element, the control valve producing control pressure at the port when the manual valve is in the forward state.

7. The system of claim 6, wherein the control valve communicates with the line pressure source, and communicates with the exhaust pressure source through the manual valve in the forward state.

8. The system of claim 6, wherein the friction element communicates with the line pressure source through the manual valve in the reverse state.

9. The system of claim 6, wherein the manual valve includes a third land for opening communication to the line pressure source through the manual valve in the reverse state and for closing said communication in the forward state, the system further comprising:

- a second friction element communicating with the line pressure source through the manual valve in the reverse state.

10. The system of claim 6, wherein the second land further opens communication through a second outlet in the manual valve to the line pressure source in the forward state, and closes said communication through the second outlet in the reverse state, the system further comprising:
- a second friction element communicating with the line pressure source through the manual valve is in the reverse state; and
- a second control valve including a second port communicating with the second friction element, the control valve producing control pressure at the second port when the manual valve is in the forward state.

* * * * *